UNITED STATES PATENT OFFICE.

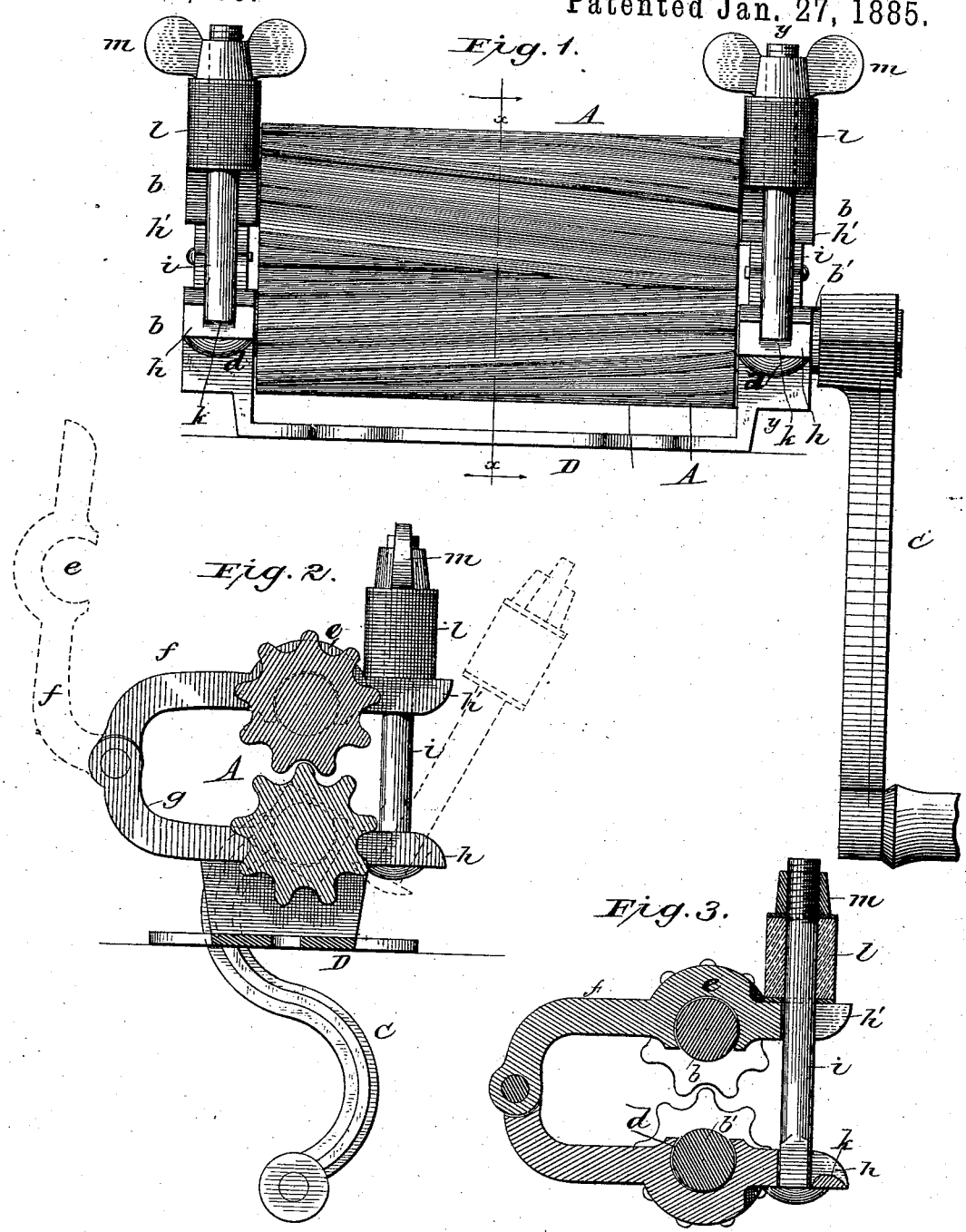

SARAH A. MOULTON, OF GRAND RAPIDS, MICHIGAN.

MEAT-TENDERER.

SPECIFICATION forming part of Letters Patent No. 311,199, dated January 27, 1885.

Application filed December 29, 1882. (No model.)

*To all whom it may concern:*

Be it known that I, SARAH A. MOULTON, a citizen of the United States, residing at Grand Rapids, in the county of Kent and State of Michigan, have invented a new and useful Meat-Tenderer, of which the following is a specification.

My invention relates to improvements in devices for tendering, crushing, or otherwise breaking up the fibers of meats preparatory to cooking the same, and more particularly to that class of tenderers in which the meat is passed between longitudinally-ribbed rollers.

I have found that while dispensing with connecting-gearing and arranging the rollers so that their ribs shall slightly interlock and transmit a positive motion from one roller to the other, it is desirable to give the ribs an inclination to the axis of the rollers, arranging them spirally on the surface of the latter. The result of this arrangement is that the piece of meat—as a steak—is tendered by a series of diagonal impressions, and by turning it bottom side up and again passing it through the rollers it will receive another series of impressions, also diagonal, but crossing the first series. The effect of this operation in thoroughly tendering the steak subjected to it will be readily appreciated.

I am aware that machines having two spirally-ribbed rollers for working hides have been heretofore used; but such devices have not been adapted to attain the results I have in view, for the reason, among others, that those machines have been made with ribs which scrape or abrade laterally the substance passed between them, the abrasion being effected by the steep inclination of the ribs and by constructing them with abrupt edges. In my tenderer, however, it is essential that, while the steak is impressed diagonally, any abrasion or scraping should be avoided, it being desirable to merely soften the internal structure of the meat without altering its surface, so as to make it unsightly in appearance or permit the escape of the juices.

Meat-tenderers are peculiarly liable to become dirty, as the juices of the meat penetrate the joints and fittings, and decay there if not removed. In constructing my machine, therefore, I have adapted it to be readily and thoroughly cleaned, particularly the journals of the rollers, as the juices are apt to pass along the rollers to those points.

To more clearly explain my invention I have shown in the accompanying drawings a machine for carrying it into effect.

Figure 1 is a side elevation of a meat-tenderer embodying my invention. Fig. 2 is a section on line $x\ x$, Fig. 1. Fig. 3 is a section through the clamping devices and roller journals and bearings.

A A are two similar rolls, which are fluted or grooved spirally, as shown. These grooves are concave at the bottoms, and the teeth or projections between said grooves are rounded or convex at the top, so as to prevent any cutting action. By making said grooves spiral I avoid any "bumping" motion, as each tooth bottoms in the corresponding groove of the other roll at one end first, and then progresses to the other end as the rolls turn, the next tooth "bottoming" in the next groove before the first is through. I thus at all times have one or more teeth at some point in line with the axes of the rolls, thus maintaining at all times a uniform distance between said axes, which would not be the case were the flutes parallel with the axes of the said rolls. Said rolls A A are also provided at their ends with journals $b\ b\ b\ b'$, the latter being prolonged, as shown, to attach a crank, C, by means of which said rolls are actuated.

D is the frame, which is provided at either end with half-boxes $d\ d$, in which the journals of the lower roll, A, revolve. Corresponding half-boxes, $e\ e$, are provided for the journals of the upper roll, A. Said half-boxes $e\ e$ are provided with extensions $f\ f$ at one end, which curve downward, and are hinged to corresponding extensions, $g$, on the half-boxes $d\ d$, which curve upward, as shown. This arrangement allows the half-boxes $e\ e$ to separate more or less from the half-boxes $d\ d$, to accommodate the varying thickness of meat passing between the rolls A A, or to be opened up entirely, as shown in dotted lines, for removal of the rolls for cleaning. The said half-boxes $d\ d$ and $e\ e$ are also provided with forked projections $h$ and $h'$, between which are inserted the bolts $i\ i$.

Between and connecting the ends of projections $h\ h$ are strips of metal or stops $k\ k$, to retain the bolts $i\ i$ in the position shown when said bolts are removed from between the projections $h\,h'$. Said stops $k\,k$ also serve to keep the bolts $i\,i$ in position when the machine is in use. The bolts $i\,i$ are provided with springs $l\,l$, of rubber or other suitable material, and thumb-nuts $m\,m$. By means of this arrangement of parts I am enabled to force the rolls A A together by an elastic pressure of greater or less intensity at pleasure, or quickly remove the said rolls from the other parts for cleaning.

The operation of my device is as follows: It is first secured to any convenient table or bench by screws through the holes in the frame. The half-boxes $d\,d$ and $e\,e$ being closed upon the journals $b\,b\,b\,b'$, the required pressure is secured by turning down the thumb-nuts $m\,m$. The rolls A A are then revolved by means of the crank C and the meat passed between the said rolls. The pressure, combined with the sliding motion of the parts in contact with the meat, will effectually crush and break up the fibers without materially expelling the juices of the said meat or cutting it into fragments.

I am aware that rolls with cutting-surfaces have been used for chopping meat or reducing it to fine particles, and said cutters have been made spiral to secure a shearing cut.

I am also aware that a roller having spiral flanges in contact with a plate having ribs arranged diagonally to the flanges on the roller are old, and to none of these do I make claim; but

What I claim, and wish to secure, is as follows:

1. In a meat-tenderer, the combination, with the supporting-frame and the actuating devices, of a ribbed roller mounted in bearings in said frame, a second ribbed roller arranged to mesh with the former, arms or links hinged to said frame and having bearings for said second roller, and swinging clamps consisting of the bolts $i$, connected loosely with the frame, and having springs and nuts adapted to engage with said links, substantially as set forth.

2. In a meat-tenderer, the combination, with the supporting-frame and the actuating devices, of a ribbed roller mounted in bearings in said frame, a second ribbed roller arranged to mesh with the former, arms or links hinged to said frame and having bearings for said second roller, and swinging clamps consisting of the bolts $i$, held loosely in apertures in the frame, and adapted to be supported in an inclined position by the cross-bars $k$, and nuts and springs on said bolts adapted to engage with forks in said links, substantially as set forth.

SARAH A. MOULTON.

Witnesses:
MYRA BRAGG,
ROBT. H. VICKERS.